United States Patent Office 3,004,657
Patented Oct. 17, 1961

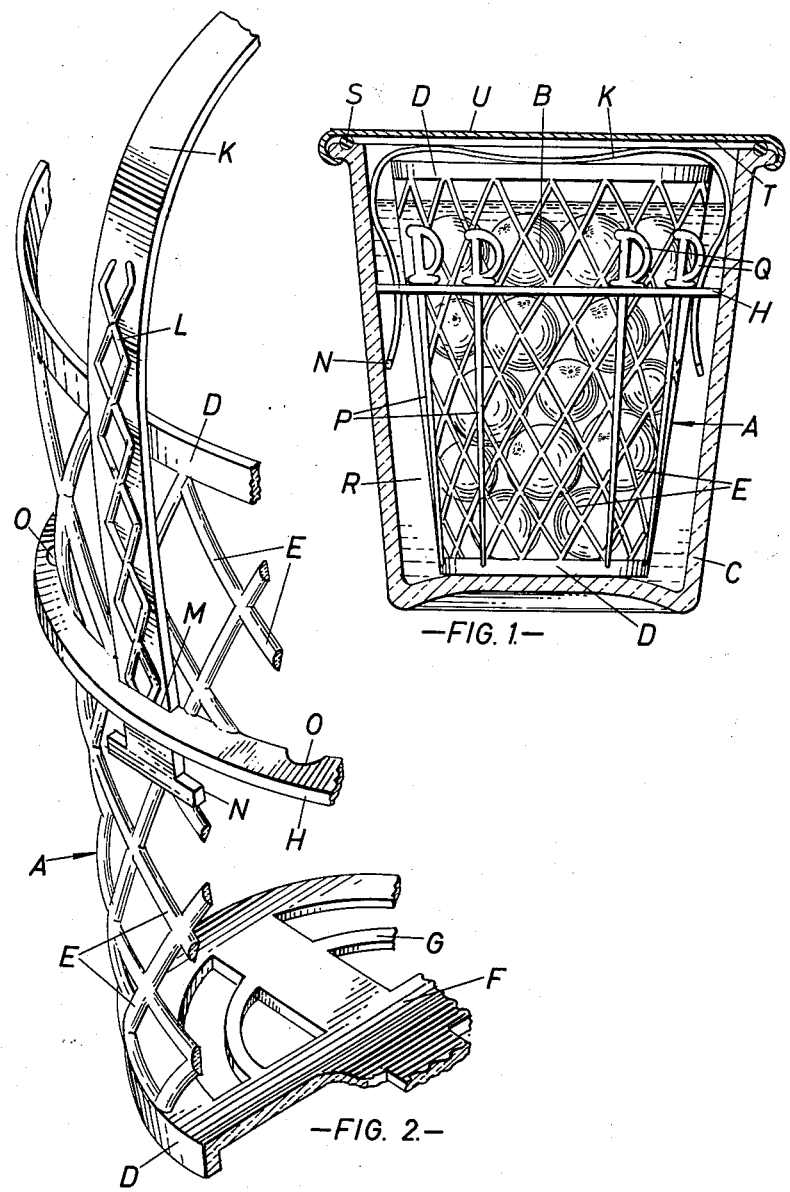
—FIG. 1.—
—FIG. 2.—
INVENTOR
Julian Hyman
BY
ATTORNEY

3,004,657
PACKING OF EDIBLE COMMODITIES
Julian Hyman, 2 Percival St., Hightown,
Manchester 8, England
Filed Nov. 28, 1958, Ser. No. 777,097
4 Claims. (Cl. 206—45.34)

This invention relates to the packing of edible commodities of the type which are desirably stored in a liquid medium, and is particularly (though not exclusively) concerned with the packing, and presentation for sale, of fruits or vegetables, such as cherries, olives, gherkins, onions etc.

At the present time such commodities are usually packed loose in sealed glass jars containing the preservative medium, which may be a syrup, vinegar, or a salt or other aqueous solution. These jars are often of substantial depth, relatively to the size of the articles therein, so that the intending user is compelled either to empty the jar into a strainer or to lift out individual articles with a spoon, fork or other article as required.

Whatever implement is used, the extraction of small smooth-surfaced articles from a jar is frequently an awkward operation liable to damage the produce and to result in spillage of liquid from the container.

In this connection, it is already known to provide within the container a self-supporting central stem having radial spines upon which the individual articles are already impaled for collective withdrawal, but this expedient necessitates the articles being carefully selected for size and shape if the storage capacity of the container is to be fully utilized.

The object of the present invention is to provide an improved packing means which is not subject to the above-mentioned drawback and which, whilst attractively displaying the contained articles and being capable of indefinitely maintaining the same in fresh condition, will enable individual articles to be extracted without being touched by hand and without risk of spilling the preservative liquid.

Furthermore, the improved pack hereinafter described forms a distinctly decorative article when placed upon a dining-table or elsewhere.

According to this invention, an improved pack for small fruits, vegetables and other edible commodities normally preserved in a liquid medium comprises a transparent impervious outer container having an airtight closure associated with a loose lid, and a snugly-fitting inner container in the form of a basket, whose contents are readily visible through the outer container and which may have a flexible or collapsible handle to facilitate its withdrawal from the liquid in such outer container.

In the case of a pack for cherries or other produce intended for introduction into cocktails or other beverages, the basket may also be utilized to carry sticks or skewers upon which individual articles can be impaled for conveyance from the basket to the drink and subsequently to the mouth.

Referring to the drawings:

FIG. 1 is a part-sectional side elevation of one form of the improved pack, and

FIG. 2 is a fragmentary part-sectional perspective view of the inner container, shown in FIG. 1, but drawn to an enlarged scale.

The particular embodiment illustrated is particularly intended for use with cocktail cherries, but the invention is of course equally applicable to the packing (in liquid) of other edible commodities, not necessarily in the form of fruits or vegetables.

The inner container comprises a frusto-conical basket A moulded in a suitable plastic material, which may be either rigid or somewhat flexible (e.g. polyethylene), convenient overall dimensions being $3\frac{3}{16}$ inches high, $2\frac{9}{16}$ inches diameter at the rim and $1\frac{2}{3}$ inches at the base. A suitable thickness for the material, which may be transparent or at least translucent, is 0.045 inch.

The wall of the basket A is formed with diamond-shaped apertures arranged to give the effect of a lattice structure and to provide the maximum practicable visibility of the cherries B or other articles within, consistent with effective retention of the latter when the basket is withdrawn from the outer container shown at C. As illustrated the basket A is moulded with solid upper and lower rings D ⅛ inch wide and connected only by half-round bars E $\frac{1}{16}$ inch wide and arranged in two mutually intersecting sets of 18 each.

The base F of the basket A is disposed level with the lower edge of the lattice structure and comprises T-section bars arranged in cruciform so as to leave four sector-shaped apertures each subdivided by a concentrically curved bar G.

To improve its rigidity under the conditions aforesaid, the basket A is encircled, at (say) 1 inch below its rim, by a flat ring H united thereto integrally or otherwise and adapted to locate against the inner periphery of the outer container C.

This ring H forms an anchorage for a handle K associated with the basket A, and preferably comprising a strip of flexible plastic, which may be embossed as at L with a diamond-pattern conforming to the lattice structure of the basket and which is threaded through diametrically-opposed slot-like openings M in the ring. The extremities of the handle K have T shaped enlargements N which depend (say) ½ inch below the ring H when the central part of the handle is lying substantially flat across the top of the basket A or alternatively abut against the underside of such ring to permit of the basket and its contents B being suspended by the handle K.

In addition to the handle-receiving openings of aforesaid, the ring H is also formed, at angularly spaced positions, with smaller opening O in which can be inserted cocktail sticks P or other skewers for extracting individual articles from the basket A, each such skewer preferably being plastic-moulded with a handle portion Q formed as a sword-hilt or otherwise and adapted to rest upon the ring H when the basket A is being carried.

The outer container C comprises a glass or transparent plastic jar which may be frusto-conical like the basket, or alternatively cylindrical in shape, its internal diameter being sufficient snugly to accommodate the ring H and the skewers P carried thereby.

After the loaded basket A has been placed in a suitable preservative liquid R within the outer container C, the latter may be vacuum-sealed in known manner with the aid of a rubber ring S inset in its rim and having adhered thereto a tinfoil or other impervious diaphragm T.

This diaphragm is protected, also in known manner, by means of a flanged plastic cover U which is sprung over its rim and which, upon removal of the diaphragm T and extraction of the basket A, can be used inverted as a drip-tray for the latter.

After the required number of cherries B or their equivalent have been withdrawn by means of the skewers P provided, any remaining in the basket A may be returned to the preservative liquid R and the outer container C closed in an airtight manner by pressing the cover U down upon the rubber ring S.

I claim:

1. A pack for small edible commodities, such as fruits and vegetables, normally preserved in a liquid medium, comprising a transparent impervious outer container having an airtight closure, and a snugly-fitting inner container in the form of a basket, whose contents are readily visible through said outer container, a horizontal planar handle of flexible plastic material extending from side to side and over the top of said basket on the outside thereof, depending legs on said handle having lateral extensions near the lower ends thereof, said extensions lying flat against the wall of the basket, a horizontal member on said basket side walls having opposed vertically extending inwardly opening grooves in which the lower portions of said legs are disposed with said extensions bridging said grooves beneath the horizontal member to prevent removal of said handle, the depending legs of said handle being slidable in said grooves, said handle being in contact with the inner face of said closure when said closure is in place, whereby said basket is held against the bottom of said outer container.

2. A pack according to claim 1 in which said horizontal member is a ring united to the outer periphery of said basket intermediate its top and bottom, said grooves being in said ring.

3. A pack according to claim 2 in which the outer periphery of said ring contacts the inside walls of said container to prevent lateral movement of said basket.

4. A pack according to claim 1 in which additional vertically extending inwardly opening grooves are provided in said member and vertical skewers are disposed in said grooves in contact with the side walls of the basket.

References Cited in the file of this patent

UNITED STATES PATENTS

| | | |
|---|---|---|
| 863,649 | Robinson | Aug. 20, 1907 |
| 1,010,037 | Frisy | Nov. 28, 1911 |
| 1,220,975 | Gemeinder | Mar. 27, 1917 |
| 1,824,907 | Lermer | Sept. 29, 1931 |
| 2,079,320 | Kalber | May 4, 1937 |
| 2,372,227 | Sanford | Mar. 27, 1945 |
| 2,443,256 | Lebold | June 15, 1948 |
| 2,540,758 | Rinnman | Feb. 6, 1951 |
| 2,649,991 | Woock | Aug. 25, 1953 |
| 2,734,358 | Himmelfarb | Feb. 14, 1956 |
| 2,785,547 | Barros | Mar. 19, 1957 |
| 2,904,205 | Callery | Sept. 15, 1959 |

FOREIGN PATENTS

| | | |
|---|---|---|
| 4,738 | Norway | Jan. 10, 1896 |